No. 703,985. Patented July 8, 1902.
G. M. BRILL.
ELECTRIC LOCOMOTIVE CRANE.
(Application filed Jan. 4, 1901.)
(No Model.) 7 Sheets—Sheet 1.
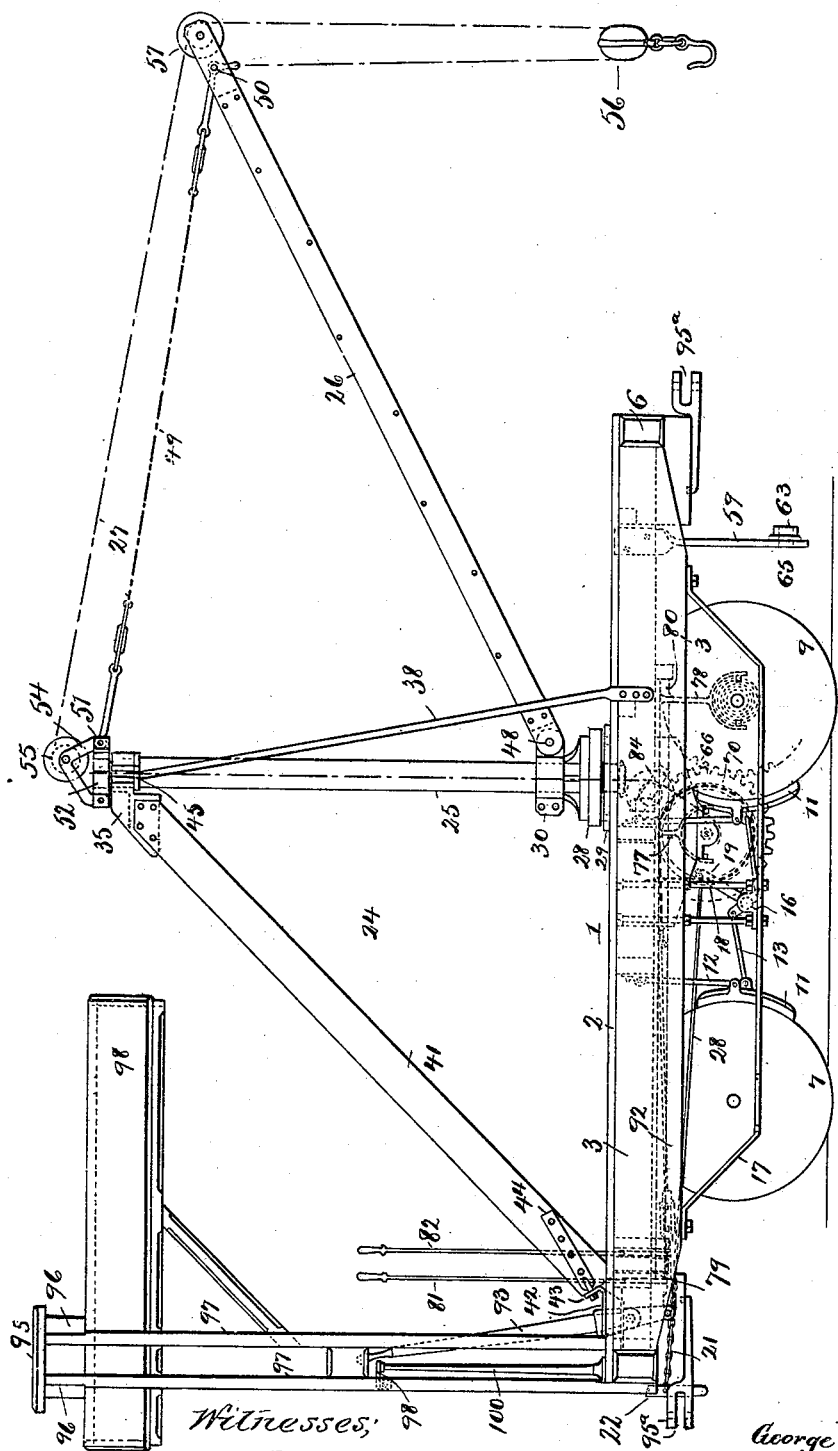
Fig. I.
Witnesses:
C. W. Benjamin
Chas. G. Hansley
Inventor:
George Martin Brill.
by Joseph L. Levy
atty

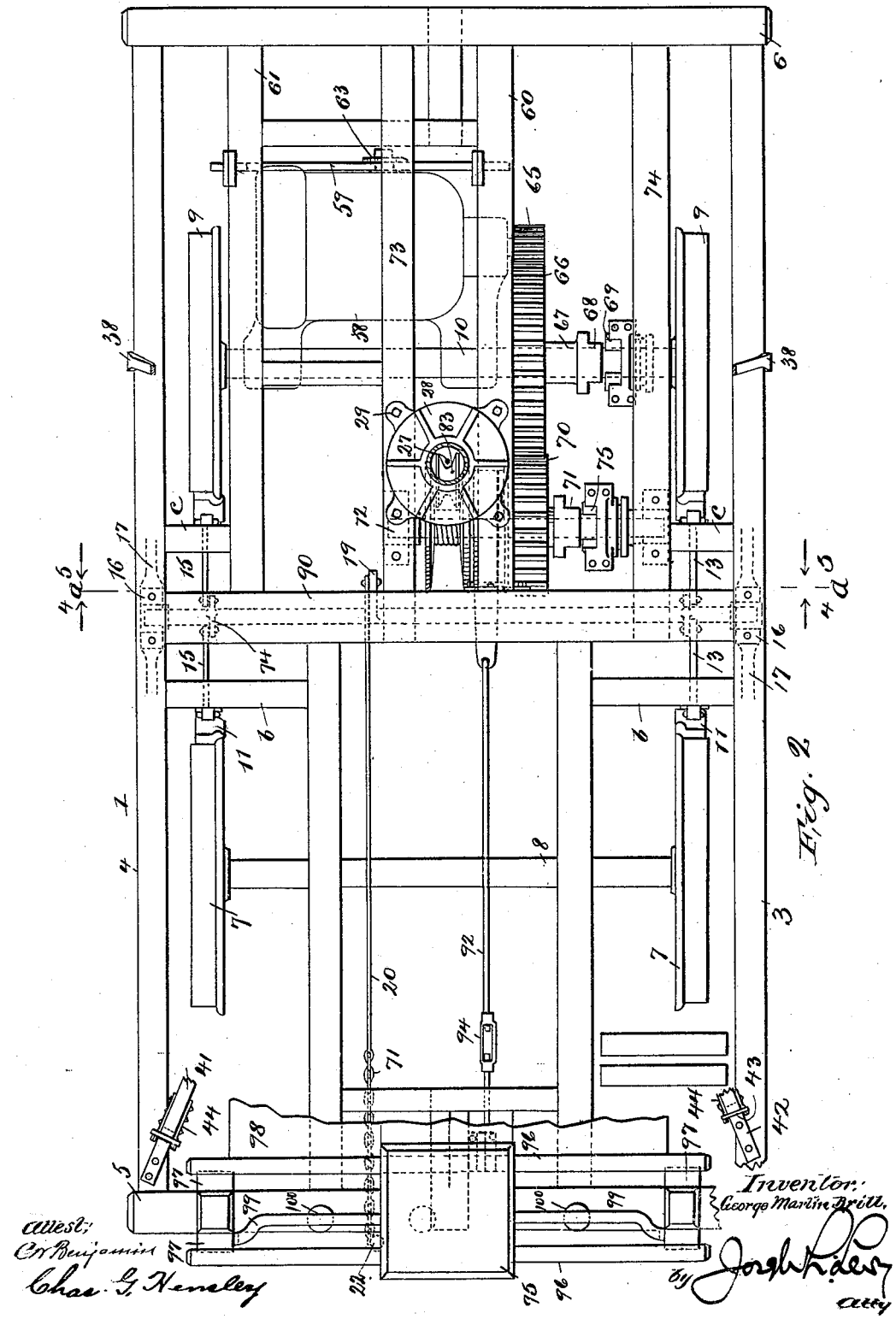

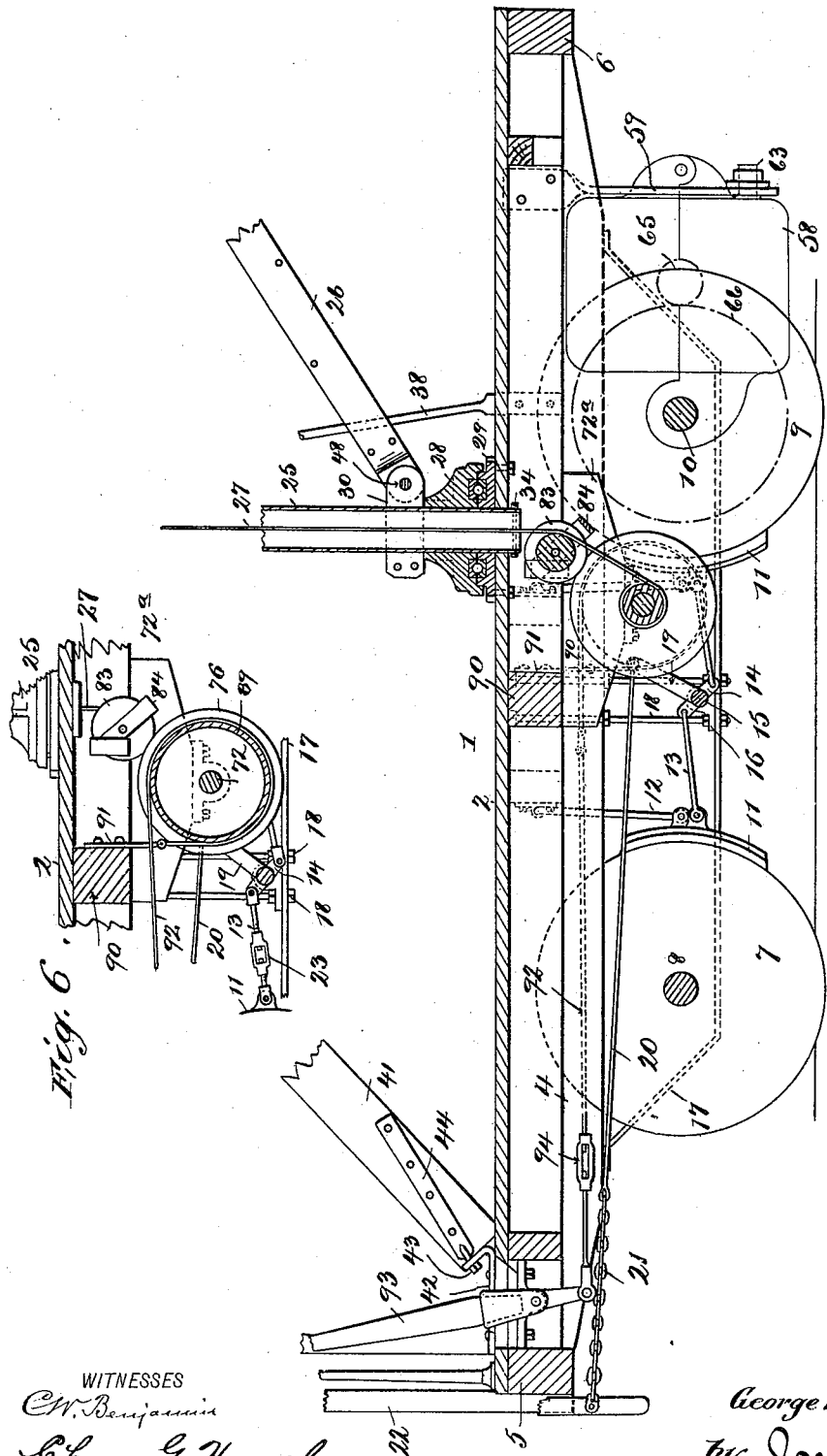

No. 703,985. Patented July 8, 1902.
G. M. BRILL.
ELECTRIC LOCOMOTIVE CRANE.
(Application filed Jan. 4, 1901.)
(No Model.) 7 Sheets—Sheet 4.
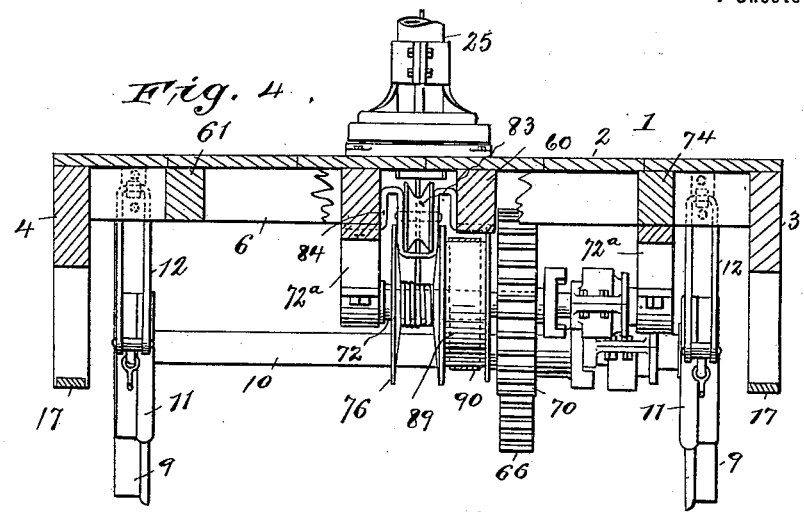
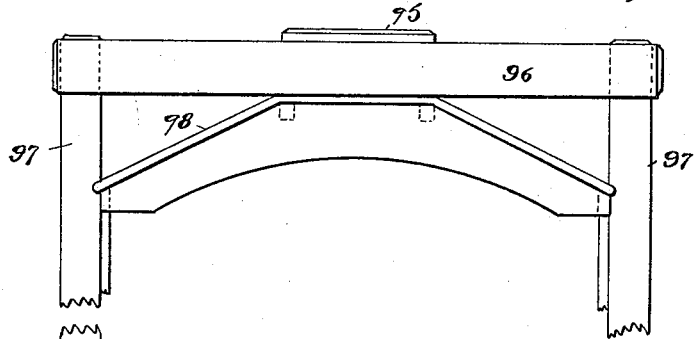
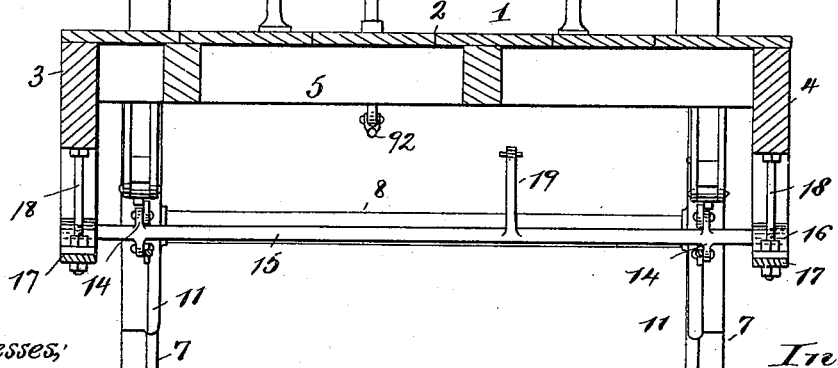
Witnesses: Inventor,
George Martin Brill,
by Joseph L. Levy
atty No. 703,985. Patented July 8, 1902.
G. M. BRILL.
ELECTRIC LOCOMOTIVE CRANE.
(Application filed Jan. 4, 1901.)
(No Model.) 7 Sheets—Sheet 5.
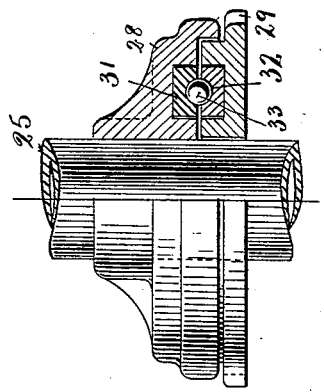
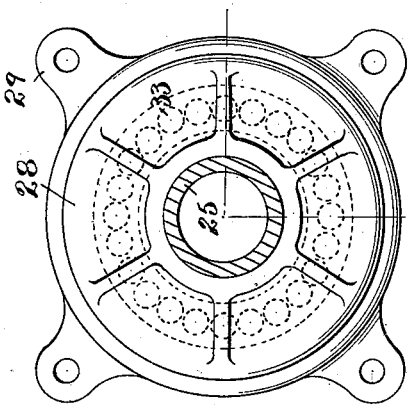
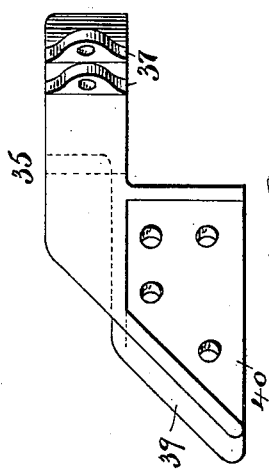
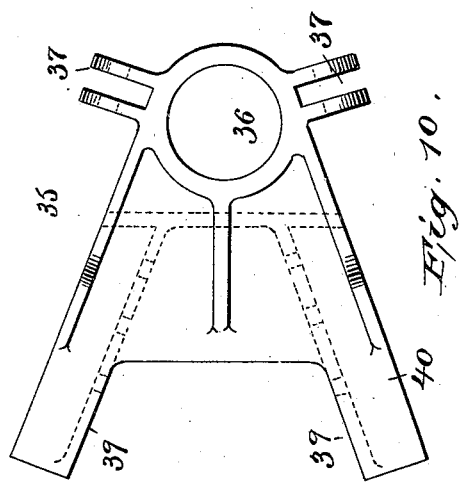
Witnesses:
Inventor:
George Martin Brill.

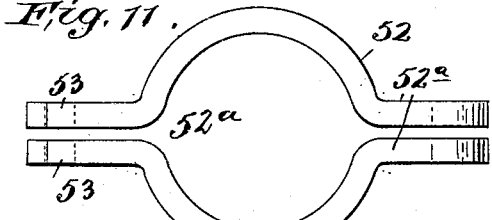
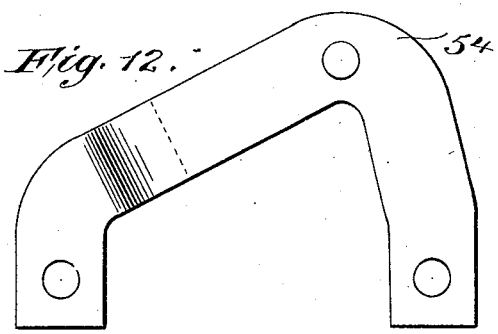
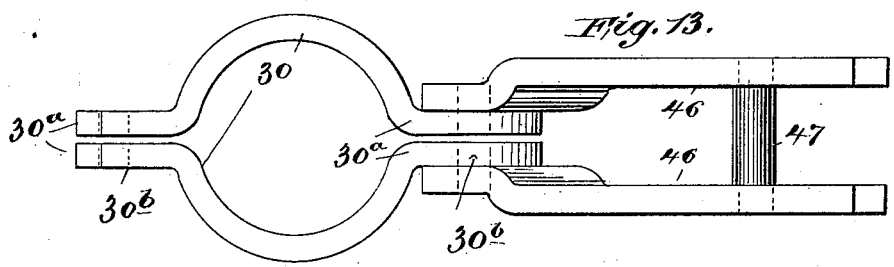
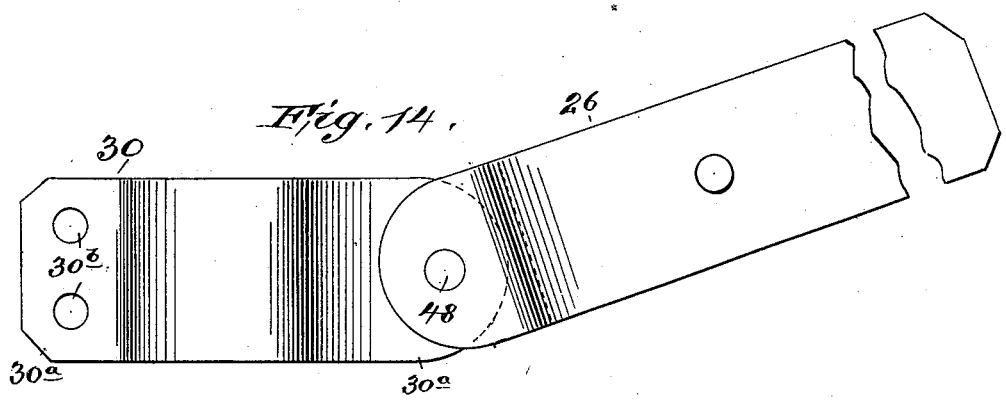
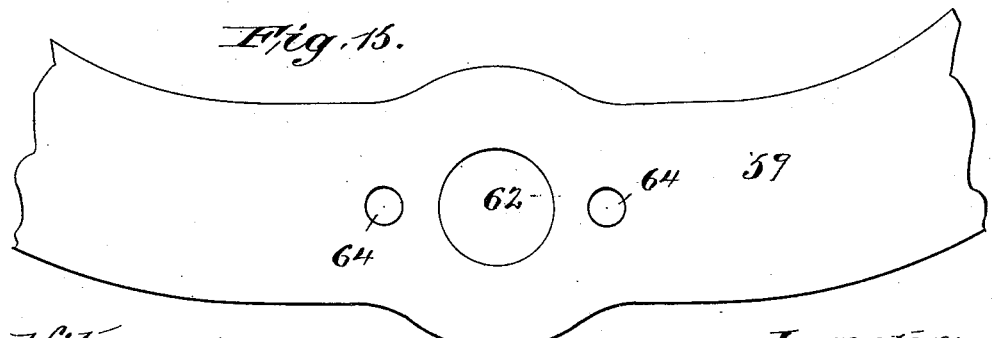

No. 703,985. Patented July 8, 1902.
G. M. BRILL.
ELECTRIC LOCOMOTIVE CRANE.
(Application filed Jan. 4, 1901.)
(No Model.) 7 Sheets—Sheet 7.
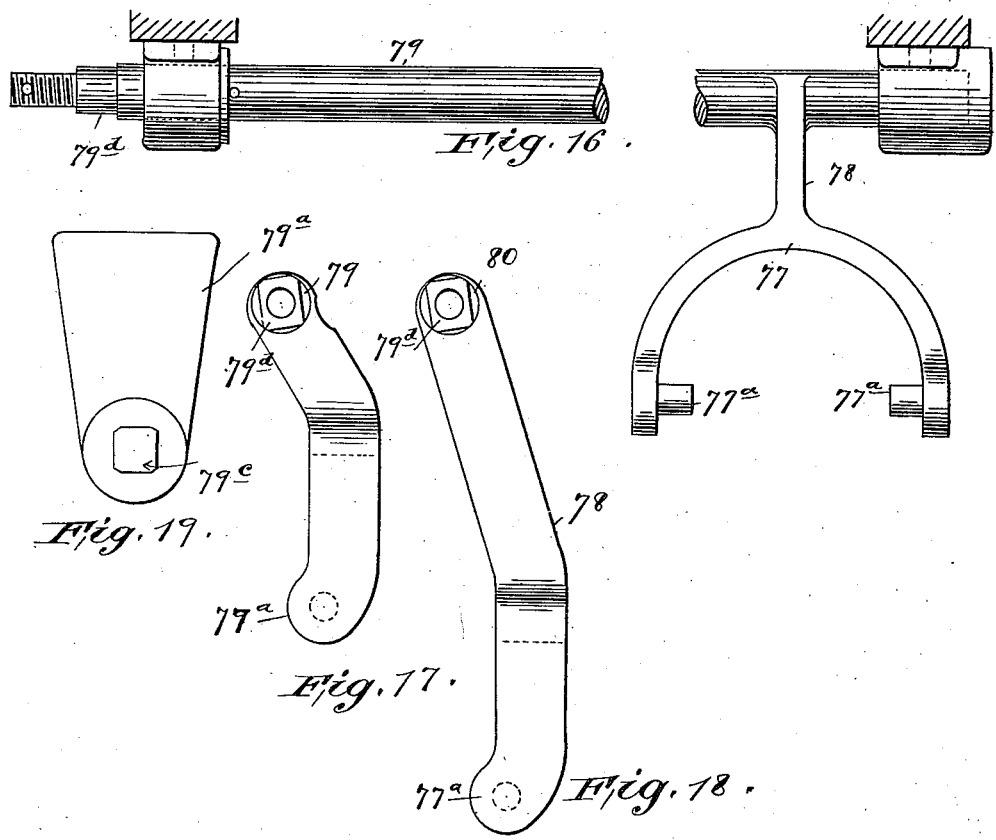
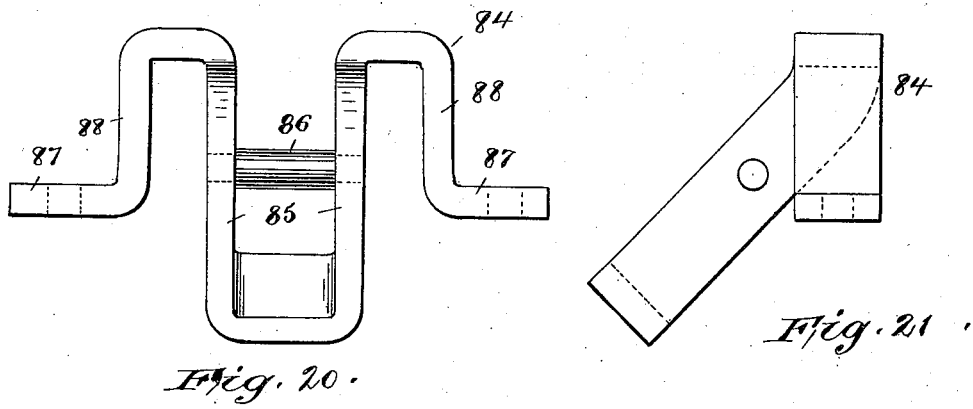
WITNESSES
INVENTOR
George Martin Brill
ATTY

UNITED STATES PATENT OFFICE.

GEORGE MARTIN BRILL, OF PHILADELPHIA, PENNSYLVANIA.

ELECTRIC LOCOMOTIVE-CRANE.

SPECIFICATION forming part of Letters Patent No. 703,985, dated July 8, 1902.

Application filed January 4, 1901. Serial No. 42,063. (No model.)

*To all whom it may concern:*

Be it known that I, GEORGE MARTIN BRILL, a citizen of the United States, residing at the city of Philadelphia, county of Philadelphia, and State of Pennsylvania, have invented a new and useful Electric Locomotive-Crane, of which the following is a specification.

My invention has for its direct object the provision of an electric locomotive-crane, although many of its features, taken singly and in combination, may be used with cranes and locomotives of other types and to kindred machinery generally. Such an electric locomotive-crane is well adapted to the universal service of shops and manufacturing establishments, where tracks are laid, and electric power is available, and is peculiarly so in and about street-railway shops and along street-lines.

Steam, gas, or similarly-operated locomotive-cranes are objectionable, since they are complicated and are subject to the dangers of explosion or fire. Moreover, with such machines skilled labor is required to operate them, and when idle they continue to consume fuel and involve expense during their period of idleness. My electric locomotive-crane, on the other hand, is simple and economical. It is easy to manage and does not require skilled labor for its operation. When idle, no fuel is consumed or other expense involved, and there is none of the above-mentioned dangers. It is ready for service at a moment's notice. Its power enables it to handle loaded trucks and shift cars. It cannot only handle heavy loads, but pick up frogs, switches, crossings, rails, and other heavy materials with great facility. It can load them upon cars and haul them to points where they are wanted. In other words, it is a carrier as well as a hauling device and makes a general utility machine. The combination of the crane with the electric locomotive in addition to all the advantages which either machine alone possesses has many others peculiar to itself, the combination being considerably more effective than either alone.

Many other advantages and improvements of the device as a whole, as well as of its separate features in combination, will appear from the detailed description.

In the accompanying drawings, forming a part of this specification, to which reference is here made and in which the same reference characters indicate like parts throughout the several views, Figure 1 is a side elevational view of the locomotive-crane. Fig. 2 is a plan view of the same, showing the crane removed above the pivot-plates and the roof broken partly away. Fig. 3 is a central longitudinal sectional elevation with the upper part of the crane and trolley stand removed. Fig. 4 is a cross-sectional elevation of the locomotive on the line *a a*, Fig. 2, looking in the direction of the arrow 4 and showing more clearly the winding-drum. Fig. 5 is a sectional view on the same line, but looking in the opposite direction, as indicated by the arrows 5. Fig. 6 is a detailed view showing the wheel-brake-lever mechanism and the band-brake for the winding-drum. Figs. 7 and 8 are respectively a partly-sectional elevation and a plan view of the pivot-plates, showing the antifriction ball-bearings therebetween. Figs. 9 and 10 are plan and side views of the casting which forms the top-mast-holder. Fig. 11 is a plan view of the semicircular bands or pipe-straps forming part of the topmast wheel or sheave holder and which are securely bolted together to clamp or grip the top of the mast. Fig. 12 is a side view of the upright members of the said holder. Figs. 13 and 14 are plan and side views, respectively, of the lower end of the boom and semicircular bands or pipe-straps, which are bolted together and to the boom to grip the mast. Fig. 15 is a face view of the lower part of the motor-holder, showing the hole for the lug on the motor. Fig. 16 is a view of one of the clutch-operating shafts. Fig. 17 is an end view of the same viewed from the threaded end. Fig. 18 is an end view of the other clutch-operating shaft, which is substantially the same as the other, save in the matter of length of the shaft and of the yoke-arms, which are longer. Fig. 19 is a side view of the lever-sockets, which are secured on the squared end of the clutch-operating shafts, and each may have a hole therein into which the lever-handle is introduced. Figs. 20 and 21 are side and end elevational views of the support for the guide-wheel at the lower end of the mast.

In the figures, 1 represents the body, comprising the deck or platform of the locomotive, which consists of planks 2, laid upon and secured to the side sills 3 4, the end sills 5 6, and the intermediate short sills or joists hereinafter described. Any kind of a car suitable for the purpose may be used, but preferably a flat-car for loading purposes. To get adhesion, the platform of the car may be loaded, as with rails or pig-iron, or receptacles or pockets for the same may be provided between the platform-sills. This body is carried in the usual manner upon the wheels and axles 7, 8, 9, and 10, (shown in Figs. 1 to 5,) axle-box pedestals (not shown, but of the usual kind) being provided for the ends of the axles and held in position between the sills 3 4, and the long brace-bars 17, which are some distance beneath the sills, extending parallel thereto and bent up at the ends at an angle and secured to the said sills, all in the usual way.

Inside brake-shoes 11 are provided for the wheels, though any ordinary type may be used, and are suspended by links 12 from the short cross joists or braces $bb$ and $cc$. They are adapted to be set or released by links 13, connected at one end to the shoes 11 and at the other to projections or short arms 14, fixed to the rod or shaft 15, which is located transversely beneath the deck or platform and is journaled at its ends in the boxes 16, that are carried by the said brace-bars 17, and by long bolts or rods 18, one at each end of the boxes, which pass down through the side sills 3 4 and through the axle-boxes and braces 17, thus serving to not only support the said boxes 16, but to stiffen said bars 17. On some point on the rod or shaft 15 a brake-lever 19 is fixed and is connected by the rod 20 and chain 21 with the brake-shaft 22 of the hand or wheel brake. When the said shaft 22 is operated to wind up the chain 21, the upright brake-lever 19 is drawn forward, tilting rods 15, with its arms 14, and the latter, together with the connecting-links 13, which act upon the principle of toggle-levers, set the shoes 11 against the wheels of the locomotive. Springs applied as usual may be employed to restore the brakes to normal position when released. A turnbuckle 23, Fig. 6, may be placed in each of the links 13 to properly adjust the same.

On the deck or platform of the locomotive, toward the rear end, there is located a swinging hoisting-crane of the ordinary type, comprising a mast 25, a boom 26, and the usual bracing, but embodying several improvements.

The mast 25, for example, is hollow and may be made of wrought-iron pipe, which construction gives great strength and at the same time allows the hoisting rope or chain 27 to descend through it to the winding-drum, placed for convenience of operation beneath the deck, the necessity of carrying the drum and an additional motor for operating it on the gib or elsewhere on the crane itself being thus avoided. The weight of the mast is carried by the pivot-plates 28 29, (shown more clearly in Figs. 7 and 8,) through which it extends and which may be of cast-iron or steel, the latter plate being adapted to be bolted to the deck-floor, while the former is secured to the mast 25 in any desired manner, such as by screw-threading. As shown, however, it is prevented from slipping on the mast or standard 25 by the pipe-straps or semicircular bands or bars 30, which, as shown in Figs. 1, 3, 13, and 14, are bars, say, of wrought-iron bent into semicircular form, with projecting ends $30^a$, perforated at $30^b$ to receive bolts or rivets by which they may be caused to firmly clamp or grip the mast. An antifriction-bearing between the plates is provided, consisting, as shown, of the races 31 and 32 and the balls 33, though it is apparent that other forms of bearings could be used. A collar or flange on the lower end of the mast beneath the deck-floor, as shown, may be provided. At the top of the mast a holder 35, which is also a casting, is provided. It is shown in detail in Figs. 9 and 10 and includes an aperture 36, through which the mast projects and in which it is journaled, lugs 37 for the guy-rods 38, which extend therefrom down to each side of the car to receive side strains on the mast and which may be fitted with turnbuckles to properly adjust them, and wings 39, having suitably-formed niches 40 therein to receive the ends of two heavy wooden guys 41, securely bolted thereto at their upper ends and to the front corners of the platform at their lower ends, where they abut against iron plates 42, bolted to the sills and bent up, as at 43, to receive the ends of the said guys 41, the bent-up portion being perforated to receive the bolts on the straps 44, attached to each side of the guys. Beneath this topmast-holder 35 a collar 45 is welded or otherwise secured to the mast 25.

The boom 26, as herein shown, consists of two narrow iron plates 46, Figs. 13 and 14, rigidly connected together by rivets or bolts and braced apart a slight distance by spacing-ferrules 47 on the bolts or rivets, though of course other material and construction may be substituted. It is pivoted or bolted at its lower end to the pipe-straps 30 at 48, as shown, and its upper end is supported by a chain or rod 49, not shown adjustable, but which may be made adjustable in the usual way and is attached thereto by the pin 50 and at its other end to a pin or bolt 51, passing through the pipe-straps 52 (shown more clearly in Figs. 11 and 12) and which are made in semicircular form with radially-projecting perforated ends $52^a$ and are adapted thereby to be firmly clamped around the top of the mast 25 by the bolt 51 and another through holes 53, the mass projecting through the holder 35 far enough to render this possible. These pipe-clamps 52 serve also to support the wheel or sheave shoulders 54, which are held upright by the bolt 51 and that through apertures 53 and are formed of wrought-iron bar bowed up and shaped, as shown, to give room for the wheel or sheave 55, which is journaled on a bolt extending between them and in such a position that the rope 27, drawn over the same, will descend the center of the mast. This hoisting-rope is attached at one end of the boom 26 in any desired manner and passes first around the pulley of the crane-hook 56, thence over the sheave 57, journaled in the end of the boom 26 to wheel 55, and down the center of mast of the winding-drum.

In order to avoid duplication of the motor for hoisting purposes and for the propulsion of the vehicle, the latter motor is also arranged to operate the winding-drum, which, together with the necessary apparatus, is conveniently located beneath the deck for this purpose, though it is conceivable that it might be located elsewhere, as upon the platform or deck. The motor 58 is suspended from the axle 10 in the usual way and the motor-support 59, the latter consisting of a plate substantially U-shaped, with its ends twisted at right angles and bolted to the joists 60 and 61 of the platform-frames, so as to depend therefrom, and having an aperture 62, (see Fig. 15,) through which the lug on the motor projects, a casting 63 being secured to the support 59, as by pins or rivets and the holes 64, to assist in supporting the motor. The motor is geared by a small pinion 65 on the armature-shaft with the gear-wheel 66, which is loosely sleeved upon the axle 10, the end of which sleeve 67 is formed into a driving-clutch 68, adapted to coact with a sliding clutch 69, which is secured to the axle 10 and which when engaged with the clutch 68 serves to rigidly connect the motor to the axle to propel the machine. The gear 66 in turn meshes with a somewhat-smaller gear 70, permanently connected with driving-clutch 71, both being loosely sleeved on the winding-drum shaft 72, which is journaled in bearings secured to blocks 72$^a$, that are attached to the under side of joists 73 and 74, and which carries at one end the sliding clutch 75, keyed thereto to coöperate with driving-clutch 71, and at its other end the winding-drum 76, also secured to the said shaft. When, therefore, the clutches 71 and 75 are interlocked, the winding-drum is operatively connected to the motor through the medium of gears 70 and 66 and the motor-pinion. The clutches 75 and 69 are shifted by the yoke-arms 77 and 78, which have inside lugs 77$^a$, running freely in the annular grooves in the clutches in the usual way, and which are secured to the shafts 79 and 80, supported underneath the deck and extending forward to the upright hand-levers 81 82. The details of these shafts and attached parts are more clearly shown in Figs. 16 to 19, Figs. 16 and 17 being, respectively, side and end views of the shaft 79, in which 77$^a$ are the lugs spoken of as running in the annular groove in the clutch 75. Fig. 18 is an end view of the shaft 80, 78 being the yoke-arm, and Fig. 19 is a side view of the lever-handle socket 79$^a$, which may be provided with a hole into which a handle or lever is inserted and a square aperture 79$^c$ to fit the squared portion 79$^d$ of the shafts. Thus by operating one or the other of these levers the motor may be connected with or disconnected from either the drum or the car-axle. A friction or other clutch may be used for the crane or for the car; but those shown are preferred.

For the purpose of guiding the rope from the center of the mast to the drum a small sheave 83 is located beneath the end of the mast and is journaled in the sheave-holder 84, (see Figs. 1, 3, 20, and 21,) which is formed of a strip of iron reversely bent upon itself several times, so as to furnish room for the sheave between its center portion 85 and to bring the ends 87 into proper position relative to the joists 60 and 73 to be bolted to the under side of the same and at the same time to bring portions 88 to bear against the sides of the joists. The portions 85 are bent at an angle to the other portions to bring them out of the way of the rope, which, as shown, passes from the center of the mast at its lower end over the sheave or guide pulley 83 to the drum 76. In whatever position the crane may be working this relationship is maintained.

A band-brake for the drum is provided and consists of the flanged cylindrical projection 89 on the end of the winding-drum 76, about which a band of steel 90 or other suitable material is wrapped, one end being supported from the cross-sill or cross-joist 90$^a$ by a stirrup 91, bolted thereto and straddling the other end of the band, which is connected with one end of a rod 92, extending forward to the lower end of an upright hand-lever 93, pivoted to the deck, and by means of which mechanism the hand-brake is applied to the drum, said rod being adjustable through the medium of a turnbuckle 94. A flanged disk on the drum-shaft 72 would likely be the equivalent of the circular projection 89.

A draw-bar 95$^a$ is placed at each end of the car. As the current would most likely be taken from an overhead trolley, a stand, to which the ordinary trolley is attached, is arranged at the forward end of the locomotive and comprises a flat base or pedestal 95, supported on two girts 96, carried by posts on standards 97, securely attached to the end sill 5. A roof 98 may also be supplied and supported, as shown, from the same posts 97.

A horizontal railing 99 is bolted at its ends to the outside posts 97, is curved inward slightly to give room for the hand-brake shaft 22, and is supported on posts 100. A controller of any pattern may be conveniently located near the railing 99 and the standards or posts 97 on the left.

All levers for the control of the various mechanisms and operations of the locomotive-crane, it will be noted, are placed within reach of one person located at the front of the platform.

Having thus described my invention, what I desire to claim, and secure by Letters Patent, is—

1. In a crane, the combination with a locomotive provided with driving-wheels; of a swinging crane mounted upon the platform of said locomotive, a winding-drum mounted beneath said platform adapted to receive the hoisting-rope, a motor carried beneath said platform, mechanism controlled from one end of said locomative for connecting said motor and said driving-wheels, mechanism controlled from the same end of said locomotive for connecting said motor, and winding-drum and brake mechanisms for said winding-drum and said locomotive-wheels, controlled from the same end of said locomotive, substantially as described.

2. In a crane, the combination with a locomotive, provided with driving-wheels; of a swinging crane mounted upon the platform of said locomotive, a winding-drum mounted beneath said platform, a brake-band upon said drum and mechanism for operating the same from the front of the locomotive, a motor suspended beneath said platform, adapted to be connected with said winding-drum and said driving-wheels, substantially as described.

3. In a crane, the combination with a locomotive provided with driving-wheels; of a swinging crane mounted upon the platform of said locomotive, a bearing-plate provided with raceways resting upon said platform, and a pivot-plate secured upon the lower portion of said crane, having corresponding raceways adapted to receive balls or rollers, said crane passing through said bearing-plate, and secured beneath the platform, substantially as described.

4. In a crane, the combination with a locomotive provided with driving-wheels; of a crane mounted upon the platform of said locomotive, a winding-drum beneath said platform, a motor suspended beneath said platform, a gear-wheel loosely mounted upon the shaft with said drum, a clutch carried by said shaft, a gear-wheel also loosely mounted upon the axle of said driving-wheels, a clutch also carried by said axle, and means for throwing said clutch into and out of action, substantially as described.

5. In a crane, the combination with a locomotive provided with a pair of driving-wheels; of a swinging crane mounted upon the platform of said locomotive, a winding-drum mounted beneath said platform, a friction-brake carried by said drum, means for operating said brake from the front of said locomotive, a motor suspended beneath the platform of said locomotive and mechanism controlled from the front of said locomotive for throwing said motor into gear with said driving-wheels or said winding-drum, substantially as described.

6. In a crane, the combination with the locomotive provided with driving-wheels; of a swinging crane mounted upon the platform of said locomotive, a motor suspended beneath the platform of said locomotive, a pinion upon the shaft of said motor, a gear-wheel loosely mounted upon the axle of said driving-wheels, a clutch carried by said axle, a rock-shaft adapted to operate said clutch, and means for actuating said rock-shaft from the front of said locomotive, substantially as described.

7. In a crane, the combination with a locomotive provided with driving-wheels, of a crane mounted upon the platform of said locomotive, a hoisting-drum mounted beneath the platform of said locomotive, a gear-wheel loosely mounted upon the shaft of said drum, a motor suspended beneath the platform of said locomotive, a pinion upon the shaft of said motor, intermediate gearing between said pinion and said loose gear-wheel, a clutch carried upon the shaft of said drum, and mechanism for operating said shaft from the front of said locomotive, substantially as described.

8. In a crane, the combination with a locomotive provided with a pair of driving-wheels; of a crane mounted upon the platform of said locomotive, a hoisting-drum beneath said platform, a gear-wheel loosely mounted upon the shaft with said gear-wheel, a motor suspended beneath said platform, a pinion carried upon the shaft of said motor, a gear-wheel loosely mounted upon the axle of said driving-wheels, said loose wheels and said pinion intermeshing, and mechanism for locking either or both of said loose gears upon their respective shafts, substantially as described.

9. In a crane, the combination with a locomotive provided with a pair of driving-wheels; of a swinging crane mounted upon the platform of said locomotive, a winding-drum carried by said locomotive, intermeshing gear-wheels loosely mounted upon the shaft of said drum and the axle of said driving-wheels, a motor, a pinion provided upon the shaft of said motor meshing with said gear-wheels and clutches for transmitting motion from said gear-wheels to said shafts, substantially as described.

10. In a crane, the combination with a locomotive provided with a pair of driving-wheels; of a crane mounted upon the said locomotive, a winding-drum carried by said locomotive, a brake carried by said winding-drum, mechanism for operating said brake from the front of the locomotive, gear-wheels loosely mounted upon the shaft of said winding-drum, and the axle of said driving-wheels, clutches carried by said shaft and axle, mechanism for operating said clutches independently from the front of said locomotive, and a motor provided with a pinion adapted to mesh with said loose gears, substantially as described.

11. In a crane, the combination with the vertical mast, the swinging boom carried thereby, and a bracket clamped upon the lower end of said mast, and supporting the lower end of said boom; of an upper bearing-plate rigidly secured upon the lower end of said mast and having its upper edge abutting against the bottom of said bracket, and a lower bearing adapted to receive the weight from said upper bearing-plate, substantially as described.

12. In a swinging crane, the combination with the vertical mast, and the swinging boom carried thereby, and a bracket clamped upon the lower end of said mast, said bracket securing the lower end of said boom; of an upper bearing-plate rigidly secured upon said mast upon which rests said bracket, raceways provided upon the lower surface of said plate, said plate being provided with a flanged edge, and a lower bearing-plate adapted to fit up under said flange, raceways provided upon the upper surface of said bearing and antifriction devices adapted to run in said raceways, substantially as described.

13. In an electric locomotive-crane, the combination with a locomotive provided with a deck or platform, of a swinging hoisting-crane thereon comprising a hollow iron mast journaled at the top and bottom, bracing to maintain the same erect, a boom secured to the mast at the lower end, the other end being supported by a rod or chain from the upper end of the mast, a sheave mounted at the end of the boom, another sheave mounted on top of the mast, a guide-wheel secured to the platform and located beneath the end of the mast, a winding-drum located beneath said platform, a hoisting rope or chain passing over the two sheaves, down the hollow mast and over the guide-wheel to the drum, a single electric motor for driving both said locomotive and said crane, the said motor being supported beneath the platform of the locomotive in the usual way, and gearing connecting said motor with both the locomotive-axle and the winding-drum whereby either may be operated.

14. In an electric locomotive-crane, the combination with a locomotive provided with a deck or platform, of a swinging hoisting-crane thereon comprising a hollow iron mast journaled at the top and bottom, bracing to maintain the same erect, a boom secured to the mast at the lower end, the other end being supported by a rod or chain from the upper end of the mast, a sheave mounted at the end of the boom, another sheave mounted on top of the mast, a guide-wheel secured to the platform and located beneath the end of the mast, a winding-drum shaft located beneath the platform on one side of one of the locomotive-axles, an electric motor on the other side of the said axle, a driving-pinion connected therewith, gears loosely mounted upon the axle and drum-shaft and meshing with each other and the motor-pinion, and means to clutch said gears to their shafts, to operate either the locomotive or the drum from the said electric motor.

15. In an electric locomotive-crane, the combination with a locomotive provided with a deck or platform, of a swinging hoisting-crane thereon comprising a hollow iron mast journaled at the top and bottom, bracing to maintain the same erect, a boom secured to the mast at the lower end, the other end being supported by a rod or chain from the upper end of the mast, a sheave mounted at the end of the boom, another sheave mounted on top of the mast, a guide-wheel secured to the platform and located beneath the end of the mast, a winding-drum shaft located beneath the platform on one side of the locomotive-axle, an electric motor on the other side having a shaft with a pinion secured thereto, a gear-wheel loosely mounted upon the shaft of the drum, and another on the axles, said gears intermeshing and the axle-gear meshing with the motor-pinion, whereby, when the motor is operated both gears are also operated, clutches carried on the axle and drum-shafts, to rotatably connect said gears with the axle or shaft, clutch-operating levers arranged near the forward end of the locomotive and connected with the said clutches whereby the crane or the locomotive may be handily connected with the motor from the forward end of the platform.

16. In an electric crane, the combination with a hoisting-crane and a winding-drum therefor, of an electric locomotive, on the deck of which the crane is carried and comprising the wheels and axles, and a motor for driving the same supported from one of the axles and the frame of the locomotive, and having a driving-pinion, a gear-wheel connected with the axle and meshing with said pinion, and means to connect said motor with the winding-drum of the crane.

17. The combination with an electric locomotive comprising a deck or platform and the usual wheels and axles, and a motor suspended beneath the deck-frame to propel the locomotive of a hoisting-crane located on the deck, and having a winding-drum therefor, and mechanism to connect said motor with said drum, or with one of the axles, of the locomotive.

18. The combination with an electric locomotive having a deck or platform, wheels and axles therefor, a motor suspended from the axle in the usual way and from the deck-frame and having a driving-pinion, a gear loosely carried upon axle and meshing with the said pinion and the clutch to connect said gear to said axle, of a hoisting-crane carried upon said deck, a winding-drum and shaft therefor, a gear-wheel loosely carried upon the drum-shaft, a clutch to rigidly connect said gear with the drum-shaft and means to operate both said clutches whereby the usual car-motor may also be utilized to operate the winding-drum.

19. In an electric locomotive-crane, a frame, an axle and a winding-drum shaft having a winding-drum secured thereto, intermeshing gears loosely mounted upon said axle and shaft, a motor supported from said axle and the frame of the locomotive and having a driving-pinion meshing with the axle-gear, and clutching means to operatively engage and disengage said gears and their shafts.

20. In an electric locomotive-crane, an axle and wheels for the locomotive, a winding-drum for the crane having its shaft located adjacent the axle, intermeshing gears loosely mounted upon the axle and shaft, a motor having a driving-pinion meshing with the gear carried by said axle, clutches to engage said gears and the shaft and axle, a hand-brake for the drum and shoe-brakes for the wheels.

21. In a swinging hoisting-crane, the combination with a revoluble mast, a platform for the mast, a lower pivot-plate through which the mast extends, an upper pivot-plate to bear upon the lower pivot-plate, through which the mast passes, clamping rings or bands about the mast and above the upper plate to clamp or grip the mast.

22. In a swinging hoisting-crane, a platform, a mast thereon, pivot-plates to form a bearing for the mast through which it extends, the lower plate being secured to said platform, a boom for the crane, clamping rings, bars or bands about the mast above the upper plate, the boom being secured at its lower end to said clamping members.

23. In a crane, a top mast-sheave holder, consisting of substantially semicircular bands or bars, bolts adapted to clamp the same about the top of the mast, bars curved upward near the middle, and supported at their ends on the said clamping-plates, and a sheave or pulley journaled between said upwardly-bent supporting-bars.

24. In a swinging crane, the combination with a cast-metal-pipe mast-holder having niches or places formed therein to which the main and side braces are attached, a mast journaled in the same, and extended up through the same clamping bars or rings, bolts to clamp the same about the upper end of the mast, sheaves supporting bars 54 secured at their ends on the said clamping-bolts, a sheave journaled between said supported bars over the end of the mast, and a boom-supporting chain or rod also secured to one of said clamping-bolts.

25. The combination with a flat-car, of a trolley-stand mounted thereon, at one end comprising vertical standards or posts, cross braces or girths secured to said standards near their upper ends, and a trolley base or pedestal secured to the said girths or braces, a motor carried by the car, and means to control the car from the front end thereof.

26. The combination with a flat-car, of a trolley-stand mounted thereon at one end, comprising vertical standards or posts, cross braces or girths secured to said standards near their upper ends, and a trolley base or pedestal secured to the said girths or braces, and a roof also supported by said standards arranged beneath the trolley-pedestal, substantially as described.

27. The combination of a flat-car, a trolley-stand carried thereon at one end, and comprising vertical standards placed near each side of the car and secured to the platform, cross braces or girths extending between said standards at their upper ends, and a trolley-stand proper or pedestal secured to said braces near the center line of the car, and a roof extending between and supported by said braces.

28. The combination of a flat-car having a platform including end sills in its construction, a trolley-stand erected at one end of the car, and comprising vertical standards near each end sill, each including two pieces secured to either side of the sill, and two joists or girths extending between the top of the two standards, and each secured to corresponding pieces thereof, and a flat base or pedestal secured to said two joists near the center on which a trolley is adapted to be mounted.

Signed at the city of Philadelphia, county of Philadelphia, and State of Pennsylvania, this 27th day of December, 1900.

GEORGE MARTIN BRILL.

Witnesses:
E. P. RAWLE,
WALTER S. ADAMS.